United States Patent [19]

Konarski et al.

[11] 4,000,854
[45] Jan. 4, 1977

[54] THRUST VECTORABLE EXHAUST NOZZLE

[75] Inventors: Mieczyslaw Konarski, Fairfield; Dudley O. Nash, Cincinnati, both of Ohio

[73] Assignee: General Electric Company, Cincinnati, Ohio

[22] Filed: Oct. 2, 1975

[21] Appl. No.: 618,796

[52] U.S. Cl. .................. 239/265.35; 60/228; 60/230; 60/242; 239/265.39
[51] Int. Cl.$^2$ .............. B64C 9/30; B64C 9/38; B64C 15/06; F02K 1/12
[58] Field of Search .......... 239/265.11, 265.19, 239/265.35, 265.37, 265.39, 265.41, 265.29; 60/228, 230, 232, 242, 269; 244/12 D, 23 D

[56] References Cited

UNITED STATES PATENTS

| | | | |
|---|---|---|---|
| 2,420,323 | 5/1947 | Meyer et al. | 60/230 X |
| 2,880,575 | 4/1959 | Scialla | 239/265.37 |
| 3,035,411 | 5/1962 | Porowski | 239/265.29 |
| 3,038,304 | 6/1962 | Alford | 239/265.41 |
| 3,214,904 | 11/1965 | Bailey et al. | 239/265.41 X |
| 3,687,374 | 8/1972 | Nash | 60/232 X |
| 3,837,411 | 9/1974 | Nash et al. | 239/265.37 X |

*Primary Examiner*—Johnny D. Cherry
*Assistant Examiner*—Andres Kashnikow
*Attorney, Agent, or Firm*—Robert C. Lampe, Jr.; Derek P. Lawrence

[57] ABSTRACT

A gas turbine engine flight maneuverable nozzle for installation within an aircraft wing or the like is provided with pivotably connected convergent and divergent flaps partially defining an exhaust stream flow path. A third flap, pivotably connected to the divergent flap, partially defines the wing control surface contour. In the cruise and flight maneuver modes, an actuation system provides synchronous movement of the convergent and divergent flaps to control, in a predetermined relationship, the areas of the exhaust stream flow path throat and exit. A vectoring actuator, carried by the main actuator, overrides the main actuator in the flight maneuvering mode and causes the divergent flap to pivot downward, thus deflecting the exhaust stream. Simultaneously, the control surface contour defining flap is repositioned to increase the control surface camber thereby increasing lift. Flow separation from the wing control surface is prevented by the effect of supercirculation due to the exhaust stream.

Flap actuator forces are reduced by providing the convergent flap with a pressure-balancing feature. Therein one surface of the flap is exposed to pressurized air from the compressor portion of the engine to create a moment about the flap pivot axis which is counter to the moment created by the pressure of the exhaust stream upon the flap exhaust stream flow path defining surface.

22 Claims, 6 Drawing Figures

THRUST VECTORABLE EXHAUST NOZZLE

BACKGROUND OF THE INVENTION

This invention relates to gas turbine engine propulsion systems and, more particularly, to exhaust devices of the flight maneuvering variety for use therein.

The invention herein described was made in the course of or under a contract, or a subcontract thereunder, with the United States Department of the Air Force.

The high velocity imparted to exhaust gases of a gas turbine engine by the exhaust nozzle provides thrust for propulsion. This thrust is substantially opposite to the direction of the flow of exhaust gases exiting the nozzle. Consequently, if the direction of the exhaust gases is changed, the direction of propulsive thrust is correspondingly varied. Typically, aircraft gas turbine engines are provided with nozzles which are fixed in the axial direction, and aircraft maneuvering is accomplished solely by airframe control surfaces. Advanced aircraft configurations contemplate, and may even require, the selective redirection (or vectoring) of gas turbine engine thrust in order to enhance aircraft performance and to provide the aircraft with operational characteristics heretofore deemed impractical. For example, if the exhaust of a conventionally installed gas turbine engine is directed downwardly, rather than rearwardly, to a direction substantially perpendicular to the engine longitudinal axis, the resulting upward thrust would provide direct lift for the aircraft and, if properly controlled, a vertical take-off and landing capability. Similarly, thrust vectoring during flight can greatly increase aircraft maneuverability since the thrust force can augment the maneuvering forces of the aircraft control surfaces such as elevators, ailerons, and rudders. In order to obtain such in-flight maneuverability, a device is required to efficiently and practically alter the direction of gas turbine engine exhaust nozzle gases.

Thrust vectoring may be employed in essentially two types of applications. First, it may be used in vertical take-off and landing (VTOL) applications where aircraft operation is at low speed and where continuous vector angle capability up to essentially 90° is required for generating aircraft lift. Secondly, thrust vectoring is employed at relatively high aircraft speed to achieve combat maneuver capability, the range of vectoring being limited to approximately 30° or 40°. The fundamental difference between these two concepts is that the VTOL application generates system lift by simply deflecting the engine flow, whereas an in-flight application utilizing the principle of supercirculation provides lift augmentation that is several times greater than the vertical thrust component of the VTOL application. As is well known in the art, supercirculation refers to the additional wing lift generation due to directing flow out of or over a wing in such a manner as to effectively change the aerodynamic shape of the wing. This lowers the required angle of attack at high subsonic maneuvering conditions, thus enabling the aircraft to make high "G" turns with less drag.

It is predicted that drag reductions in excess of 40% are attainable at typical combat conditions when an aircraft incorporates a flight maneuverable propulsion system for lift augmentation wherein the engine exhaust flow is expelled past the wing in such a manner as to provide the additional lift through supercirculation. This drag reduction allows the engine to be sized significantly smaller than otherwise possible.

Many types of thrust vectoring nozzles have been studied in the past. For example, the three-bearing hinge flap nozzle taught in U.S. Pat. No. 3,687,374, D. O. Nash, entitled "Swivelable Jet Nozzle," and which is assigned to the assignee of the present invention, is a conventional axisymmetrical nozzle supported on a duct equipped with three rotatable bearings to achieve thrust deflection. It is primarily a V/STOL nozzle and not readily adaptable to in-flight maneuver vectoring due to rather large drag-producing base areas while in the deflected mode. The block-and-turn type of swivel nozzles as depicted in U.S. Pat. No. 3,035,411, C. P. Porowski, and U.S. Pat. No. 3,837,411, D. O. Nash et al, both of which are assigned to the assignee of the present invention, require a flow-diverting valve for selection between the cruise nozzle and the V/STOL nozzle. Such a valve in combination with two exhaust nozzles results in a heavy structure which does not integrate well with an aircraft wing flow field when it is desired to take advantage of the supercirculation effects.

An important consideration in the development of an efficient propulsion nozzle is control of the flow path throat area (area of minimum cross section) and the area at the discharge of the nozzle. The throat area is normally defined by a convergent/divergent portion of the nozzle. A convergent section of the nozzle is designed to keep the turbine discharge gases subsonic until they reach the throat, at which time they reach a sonic velocity. A divergent portion subsequently allows controlled expansion of the gases which permits their velocity to become supersonic. In addition to the absolute value of the flow path throat area and the nozzle exit area, the ratio of the latter to the former is a significant parameter governing thrust propulsive efficiency. The exhaust system design greatly influences the overall engine performance and the choice of nozzle areas is determined by turbine inlet temperature, mass airflow, and the velocity and pressure of the exhaust stream. While little is to be gained by use of variable area nozzles in low performance aircraft, in high performance aircraft significant operational advantages can be realized.

Typically, the variable area nozzle is opened during low altitude take-off and closed thereafter, at an appropriate altitude, in order to obtain necessary cruise thrust. The nozzle is usually automatically controlled on a predetermined schedule by the main engine control as required by the flight environment. The addition of an in-flight thrust vectoring capability to gas turbine engines introduces a new dimension into nozzle area controls and means must be devised to essentially override the "nominal" area scheduling in order to produce optimum nozzle areas during the thrust vectored (or flight maneuvering) mode. Such a system should be as simple as possible consistent with the requirements of a fail-safe design.

Furthermore, nozzles which cooperate with aircraft wing and flap structure are inherently wide (i.e., possess a large span). Accordingly, a large area is available upon which the exhaust gases act, thereby requiring large flap actuation forces and heavy actuators. Since weight is always of paramount consideration in aircraft component design, a means is desired to reduce actuation loads and actuator weight.

The problem facing the gas turbine engine and aircraft designers, therefore, is to provide a flight maneuverable propulsion nozzle which minimizes flow turning losses, is matched to the aircraft wing to take advantage of the effect of supercirculation, provides adequate nozzle area control and which can be manipulated with a minimum of actuators.

SUMMARY OF THE INVENTION

Accordingly, it is the primary object of the present invention to provide a flight maneuverable exhaust device of reduced complexity which is aerodynamically contoured for disposition within an aircraft wing.

It is another object of the present invention to provide an exhaust device which cooperates with the wing to increase lift through supercirculation.

It is a further object of the present invention to provide an exhaust nozzle which will provide adequate nozzle area modulation throughout the flight envelope.

It is yet another object of the present invention to provide an exhaust nozzle of light weight which can be manipulated with a minimum of actuators.

These and other objects and advantages will be more clearly understood from the following detailed description, drawings and specific examples, all of which are intended to be typical of rather than in any way limiting to the scope of the present invention.

Briefly stated, in one embodiment the above objectives are accomplished in a twin-engine aircraft by mounting gas turbine engines within both sides of the aircraft fuselage. In each engine a transition duct directs the exhaust gas from that engine outwardly into the wing wherein it is reheated in a high aspect ratio duct burner assembly contoured to the wing profile. Maximum aerodynamic advantage of the exhaust gas is achieved by ejecting it through a flight-maneuverable exhaust nozzle formed over a significant portion of the wing span at the trailing edge.

The exhaust nozzle includes an exhaust stream deflector partially defining both the exhaust stream flow path and an aircraft control surface (such as a wing). Synchronous movement of three flaps comprising the deflector ensures proper internal area control and exhaust stream vectoring. A first flap pivotably connected to a fixed duct section provides a variable exhaust stream flow path area convergence capability while a downstream divergent flap serves to provide both exhaust gas expansion control and deflection. A third flap, partially defining the aircraft control surface, is adapted to provide variation in camber of the control surface. Synchronous movement of the flaps is attained by means of a pair of actuators in combination with a bellcrank and links of such dimensions that the three flaps move in unison to optimize the nozzle internal and external flow path contours for a range of flight operating conditions. In particular, in the cruise mode, a main actuator and linkage arrangement provides synchronous movement of the convergent and divergent flaps to control, in a predetermined relationship, the areas of the exhaust stream flow path throat and exit. A vectoring actuator, carried by the main actuator, overrides the main actuator in the flight maneuvering mode and causes the divergent flap to pivot downward, thus deflecting the exhaust stream. Simultaneously, the control surface contour defining flap is repositioned to increase the control surface camber to increase lift. Flow separation is prevented by the effect of supercirculation due to the exhaust stream.

Flap actuation forces are reduced by providing the convergent flap with a pressure-balancing feature whereby one surface of the flap is exposed to pressurized air from the compressor portion of the engine to create a moment about the flap pivot axis which is counter to the moment created by the pressure of the exhaust stream upon the flap exhaust stream flow path defining surface.

DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which is given by way of example with the accompanying drawings, in which:

DESCRIPTION OF THE PREFERRED EMBODIMENT

Figure 1:
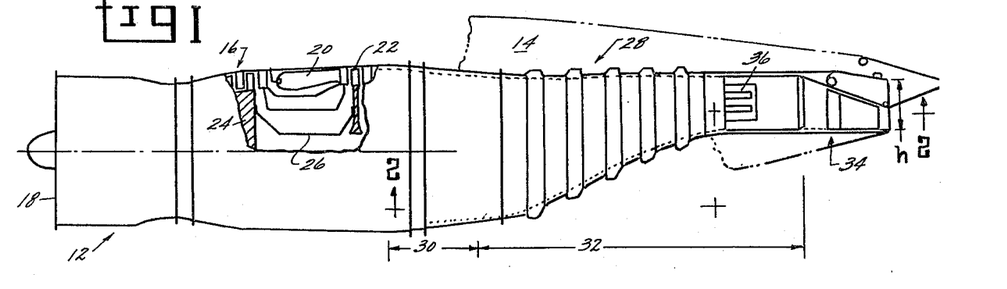
FIG. 1 is a side profile in partial cut-away schematically depicting a representative integration of the exhaust nozzle of the present invention with a gas turbine engine and an aircraft control surface.
Figures 2, 3:
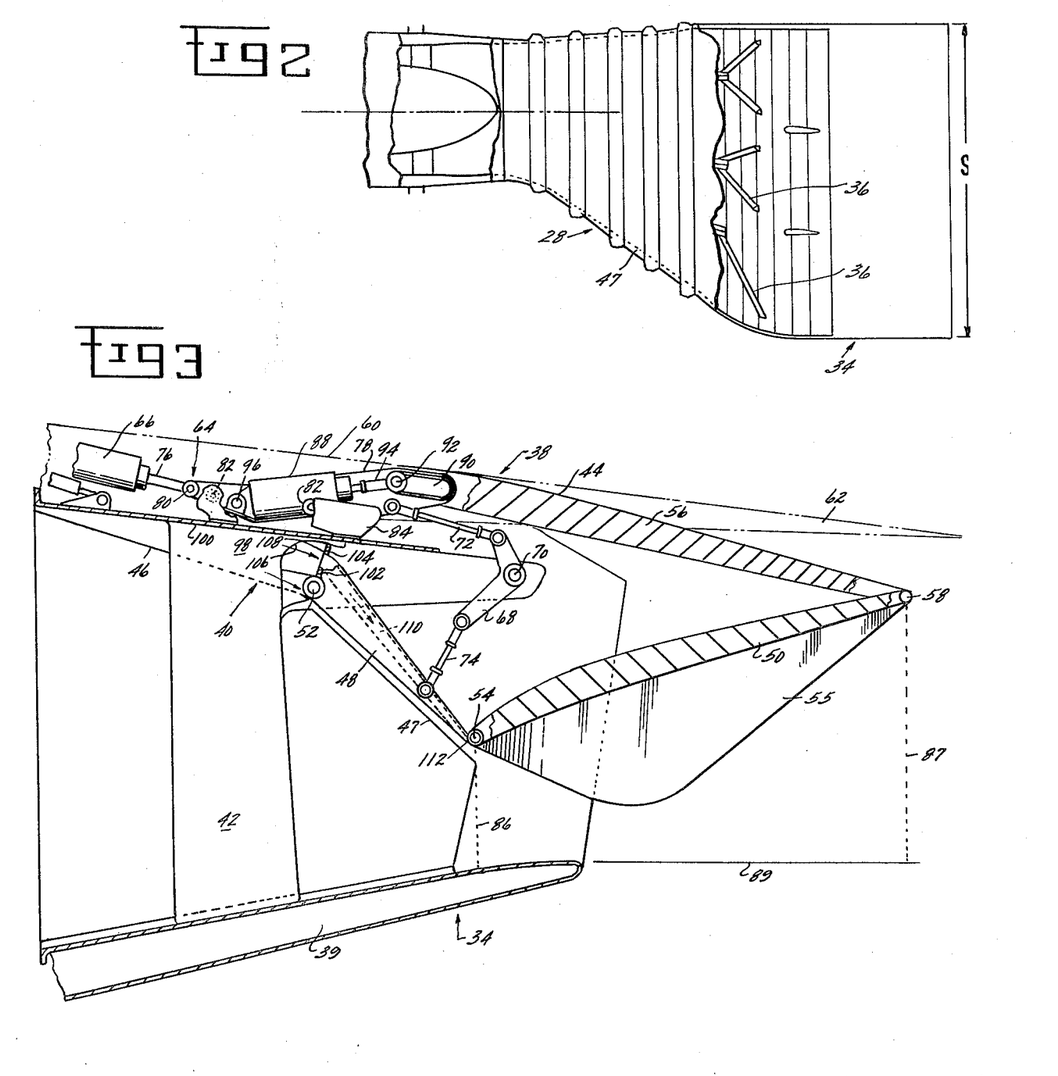
FIG. 2 is a plan view of the exhaust nozzle taken along line 2—2 of FIG. 1.
FIG. 3 is an enlarged cut-away schematic representation of the flight maneuverable exhaust nozzle of FIG. 1 in a non-augmented operating mode.

Referring to the drawings wherein like numerals correspond to like elements throughout, attention is first directed to FIGS. 1 and 2 wherein a propulsion system incorporating an exhaust device constructed in accordance with the present invention is diagrammatically shown. While not so limiting, the propulsion system is meant to be representative of a twin-engine installation wherein two gas turbine engines 12 are mounted symmetrically within or beneath an aircraft structural member, such as the fuselage or wing 14, shown in phantom in FIG. 1. Because of the symmetry of the system, only one engine 12 is shown. It is recognized that a similar propulsion system, in mirror image, would appear on the other side of the aircraft.

Briefly stated, the engine 12 comprises an axial flow compressor 16 which pressurizes air entering inlet 18 to support combustion of fuel in combustor 20. The hot gas stream generated by combustor 20 is expanded through and drives turbine 22 which, in turn, is drivingly connected to the rotor portion 24 of the compressor 16 by shaft 26 in the usual manner of a gas turbine engine. After the gases are expanded through turbine 22, they enter an exhaust stream depicted generally at 28 and which comprises, in serial flow relationship, a diffuser 30, a transition duct 32, and a flight maneuverable exhaust device 34. As used hereinafter, the term "exhaust device" is meant to include a core engine exhaust nozzle or any other gas turbine engine exhaust nozzle whether or not it is preceded in serial flow relationship by a combustor. Augmenters (or afterburners)

36 of a known variety are incorporated within the transition duct section to provide thrust augmentation in the usual manner. A detailed description of the preferred high aspect ratio transition duct and augmenter construction appears in co-pending U.S. patent application Ser. No. 591,879, filed June 30, 1975, "Aircraft Propulsion System With Flight Maneuverable Exhaust Nozzle," - Beavers et al, which is assigned to the assignee of the present invention and the disclosure of which is incorporated herein by reference.

In general, the exhaust system's integration within an aircraft fuselage/wing arrangement improves as the exhaust jet span-to-height ratio ($s/h$) increases (FIGS. 1 and 2), since a long, flat duct minimizes the bulge required to house the exhaust system in the wing. (As used herein, the ratio $s/h$ is defined as "aspect ratio".) However, exhaust system weight, internal flow losses and cooling difficulty also tend to increase with aspect ratio. These conflicting trends suggest that an optimum aspect ratio exists which can only be determined from the design considerations of the complete aircraft system. In some applications, aspect ratios as high as 30 would not be unrealistic, whereas the aspect ratio of FIGS. 1 and 2 is more in the order of 5.

Due to the effect of supercirculation, also discussed at length in the aforementioned co-pending patent application Ser. No. 591,879, the designer is able to lower the required aircraft angle of attack at high subsonic maneuvering conditions, enabling the aircraft to make high performance turns with less drag. The exhaust device to be described hereinafter incorporates the principle of supercirculation and provides a highly efficient thrust vectoring capability to improve aircraft maneuverability.

Figure 4:
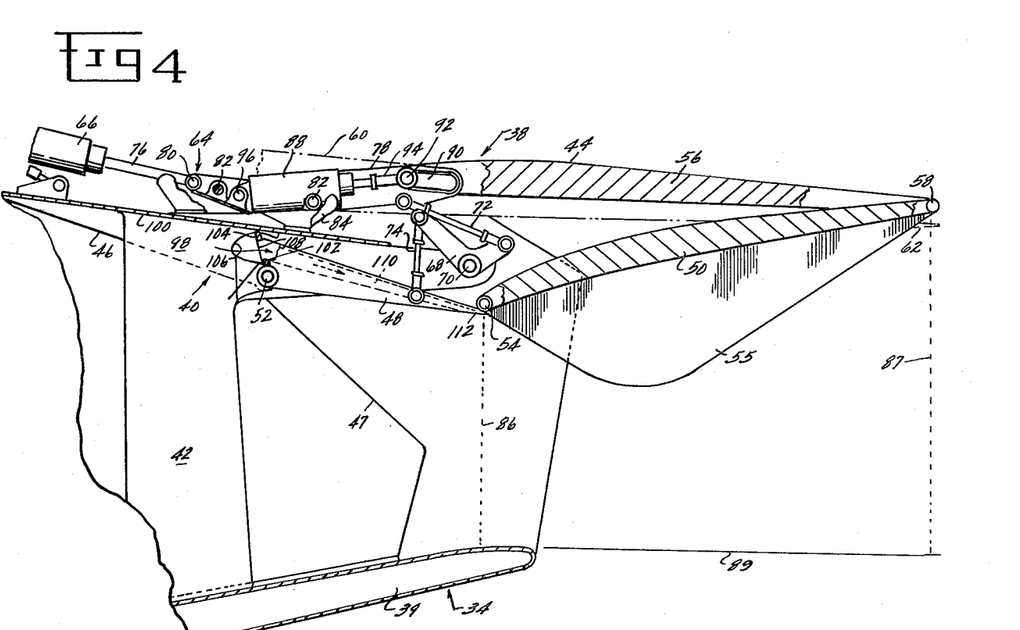
FIG. 4 is a view, similar to FIG. 3, depicting the exhaust nozzle of FIG. 1 in an augmented operating mode.
Figure 5:
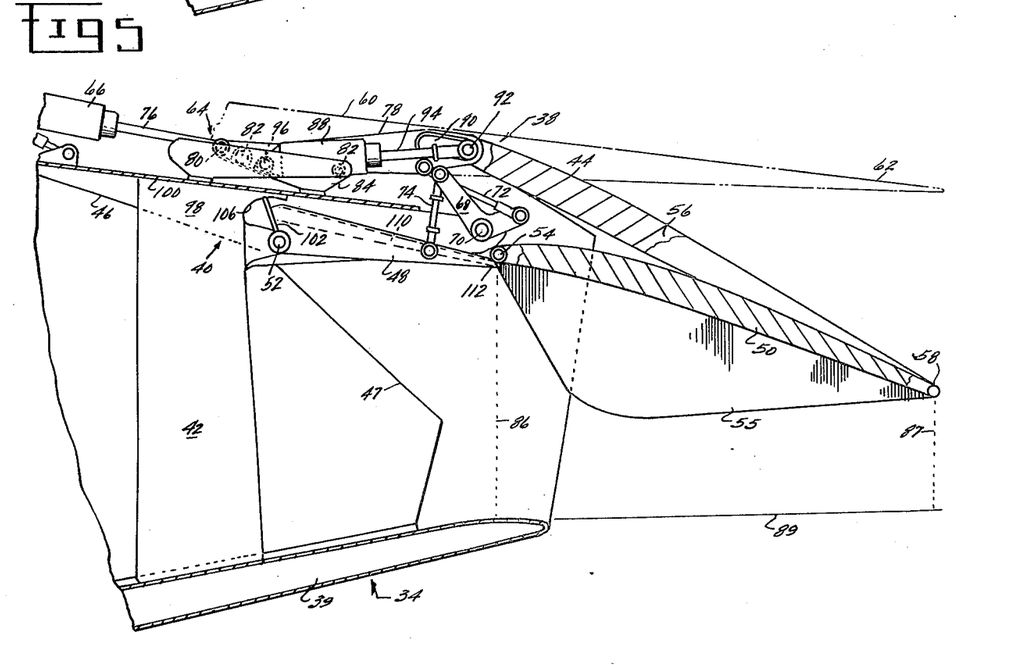
FIG. 5 is a view, similar to FIG. 3, depicting the exhaust nozzle of FIG. 1 in a flight maneuvering operating mode.
Figure 6:
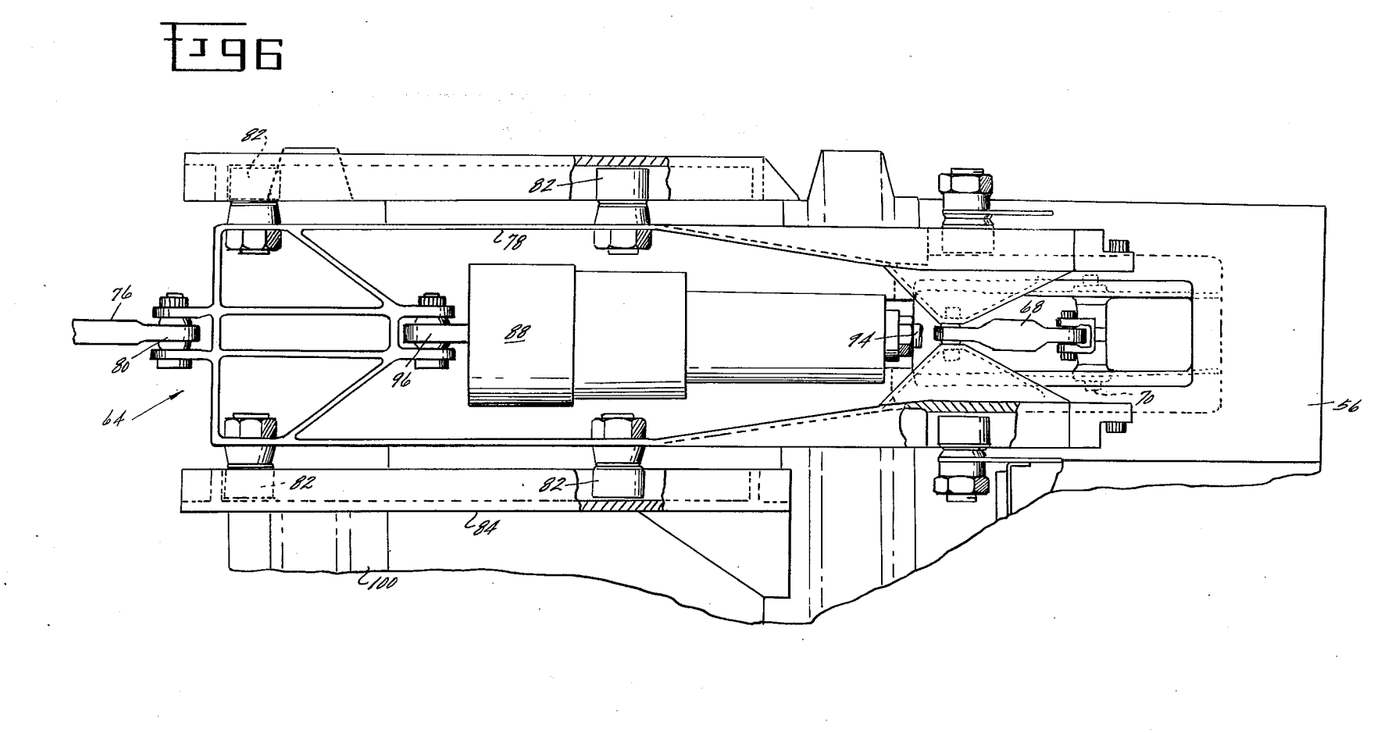
FIG. 6 is an enlarged plan view of a portion of the actuation system of the exhaust nozzle of FIGS. 3 through 5.

Referring now to FIGS. 3 through 5, wherein the subject invention is depicted in greater detail, it is significant to note that nozzle 34 is substantially two-dimensional, meaning that its cross-sectional profile is essentially constant across its high aspect ratio span, matching transition duct section 32. Opposed walls 38 and 39 partially define an exhaust stream flow path 42 therebetween. Wall 38 includes an inner surface designated generally at 40 and partially defining the exhaust stream flow path 42, and an outer surface 44 which defines an aircraft control surface contour, here a wing flap. The inner surface 40 comprises a generally convergent fixed duct portion 46, which here comprises an extension of transition duct section 32, and first and second flaps, 48 and 50, respectively. Flaps 48 and 50 are of the variable position variety, the first flap 48 being pivotably connected, for rotation about an axis at 52, to the upstream fixed duct portion 46 and adapted to provide a variable exhaust stream flow path area convergence capability. Thus, flap 48 may be termed the "convergent flap." Downstream of the convergent flap, and pivotably connected at the aft extremity thereof at 54, is the second flap 50 which is adapted to provide variable exhaust stream expansion control in at least one, or a first, operative mode and further adapted to deflect and turn the exhaust stream in another, or second, operative mode as discussed hereinafter. Contoured flap sides 55 are provided upon flap 50 to prevent exhaust stream flow spillage around the sides thereof with subsequent loss of propulsive efficiency.

The outer surface 44 is essentially comprised of a third flap 56 also of the variable position variety which is pivotably connected to the second flap 50 proximate their downstream extremities at 58, while the upstream extremity of flap 56 is operatively connected to actuation means soon to be described. Thus, flap 56 comprises a flap extension of a fixed flight surface structure 60, much in the manner of a wing and aileron. It is recognized that flap 56 may comprise a full-span flap extending the entire span of flight structure 60 or may comprise a part-span flap, in which event the fixed extention portion of structure 60 appears as 62. The three flaps 48, 50 and 56 together form an exhaust stream deflector means capable of controlling the exhaust stream flow path area throughout the flight envelope. They are operatively connected together, and to the fixed duct portion 46, by an actuation system denoted generally at 64 which provides for the synchronous movement of the three flaps.

During the cruise modes represented by FIG. 3 (without augmentation) and FIG. 4 (with augmentation), area modulation is provided primarily by means of main actuator 66 in cooperation with bellcrank 68 (pivotable about axis 70) and a pair of links 72 and 74. In particular, one end of main actuator 66 is affixed to the rigid nozzle structure and the other end, comprising actuator arm 76, is connected to a carriage 78 at 80. The carriage includes a plurality of rollers or trunnions 82 protruding therefrom which are adapted to be carried in sliding relationship by a pair of parallel tracks 84 firmly mounted upon rigid nozzle casing structure 100. Thus, actuation of actuator 66 causes carriage 78 to translate substantially axially along tracks 84. This, in turn, causes link 72 to rotate bellcrank 68 about its axis 70 thereby positioning flap 48 through the operative connection with link 74. As flap 48 is caused to rotate about its pivot 52 it, in turn, moves flap 50 through joint 54 and the downstream extremity of flap 56 through connection 58. Necessary motion of the forward end of flap 56 is accomplished through translation of carriage 78 by means of an operative connection soon to be described. The links and cam are so proportioned that the optimum divergent flap (50) angle is scheduled as a function of throat area 86, the throat being defined as the minimum area between flaps 48, 50 and wall 39.

For vectored operation in the flight maneuvering mode of FIG. 5, vectoring actuator 88 (of which there may be one or more) translates flap 56 with respect to carriage 78 independent of the nozzle throat area and divergent flap angle. The aft end of carriage 78 is provided with an oblong aperture 90 which receives, in sliding relationship, a trunnion or roller 92 formed upon the upstream terminus of flap 56. The trunnion is connected to a piston arm 94 of vectoring actuator 88 which, like main actuator 66, may be of the hydraulic variety and which is static with respect to carriage 66 except for rotational freedom about its pin connection 96 with the carriage. Accordingly, actuation of actuator arm 94 causes trunnion 92 to be guided within and along aperture 90 to effectively increase or decrease the camber of the aircraft control surface and enhance lift through the effect of supercirculation. Thus, the vectoring actuators ride in the movable carriage 78 and during the non-vectored operating modes of FIGS. 3 and 4 are static, simply holding the flap trunnion 92 against the forward-most end of slot 90. The main actuator 66 for nozzle area control may be located in any convenient location on the nozzle structure since the aforedescribed mechanism produces the motion relationship between the flaps, this being independent of actuator location. Flexible lines (not shown) may be used to service these preferably hydraulic actuators in much the same manner as aircraft brake systems.

In operation, the nozzle throat area 86 and variable convergent flap 48 are positionable as a function of engine power setting alone whereas the position of flaps 50 and 56 is a function of both aircraft power setting and thrust vector angle (an aircraft flight control function). Thus, flap 48 is controlled by the engine control system while flaps 50 and 56 are controlled by both the engine control and flight control systems. The present invention provides a means for control of flaps 50 and 56 without complete integration of the two systems, thereby improving reliability.

Furthermore, actuator 66 controls the throat area 86 and nozzle exit area 87 defined in part by the downstream extremity of flap 50 and exhaust stream boundary (streamline) 89. The relationship of these areas is critical to the propulsive efficiency. While actuator 88 essentially overrides actuator 66 with respect to nozzle exit area when in the thrust vectoring mode, if actuator 88 were to fail the throat and exit area control would still be provided by actuator 66 for optimized performance throughout the flight regime (except for the thrust vectoring modes). The system, therefore, has an inherent fail-safe feature.

Flap actuation is assisted by means of a unique pressure balance arrangement utilizing compressed air drawn from the fan or compressor portion of the engine. This air is drawn into a plenum 98 formed between thermal liner 47 and the rigid structural casing member 46. The forward (left in FIG. 3) end of flap 48 is provided with a generally planar face 102 having a seal extension 104 which pivots with flap 48 about hinge point 52, with the end of extension 104 in sweeping contact with an arcuate sealing surface 106 comprising a portion of the rigid structural casing member 46. Face 102 is, in essence, a face of a pressure balance piston which is subject to the pressure of the air in plenum 98. This pressure multiplied by the area of face 102 equals a force creating a clockwise moment about axis 52. This, at least partially, counterbalances the counterclockwise moment created by the exhaust gas pressure acting upon the large areas of flaps 48 and 50 and thus reduces actuation loads. This, in turn, reduces actuator size and weight, an important consideration in aircraft installations.

Flap cooling is provided by means of the film cooling technique. The same fluid which provides the flap pressure balance also serves the cooling function. In particular, air is bled from plenum 98 through at least one aperture 108 within face 102, thereby communicating plenum 98 with the interior flap 48. Conduit 110 carries the cooling fluid to the junction 54 of flaps 48 and 50 where it is ejected through a slot 112 in a film over divergent flap 50.

Thus, a flight maneuverable exhaust device has been provided which is aerodynamically contoured for disposition within a wing and which utilizes the effect of supercirculation for lift enhancement. Nozzle area modulation is provided throughout the flight envelope by a fail-safe actuation system of reduced complexity. Furthermore, the aforedescribed actuation system eliminates the necessity of integrating the independently complex aircraft control and engine control systems.

It will be obvious to one skilled in the art that certain changes can be made to the above-described invention without departing from the broad inventive concepts thereof. For example, the thrust vectorable exhaust nozzle could be installed in an aircraft fuselage pod and still retain a thrust vectoring/flight maneuvering capability without the added benefits of supercirculation. Additionally, it is recognized that the lengths and other dimensions of the actuation components may be altered to meet specific engine requirements without departing from the teachings of the present invention. It is intended that the appended claims cover these and all other variations in the present invention's broader inventive concepts.

Having thus described the invention, what is claimed as novel and desired to be secured by Letters Patent of the United States is:

1. A flight maneuverable exhaust device for use with a gas turbine engine comprising:
   first variable position flap means partially defining an exhaust stream flow path having a throat and an exit, said first flap means being pivotably connected to an upstream fixed duct portion for varying exhaust stream flow path area convergence;
   second variable position flap means further defining the flow path, said second flap means being downstream of and pivotably connected to the first flap means for providing variable exhaust stream expansion control in a first operating mode and exhaust stream deflection in a second operating mode;
   third variable position flap means pivotably connected to the second flap means proximate their respective downstream extremities, said third flap means partially defining a variable contour flight control surface; and
   an actuation system operatively connected to at least one of said flap means for synchronously moving said first, second and third flap means to control, in a predetermined relationship, the exhaust stream flow path throat area and the exhaust stream flow path exit area.

2. A flight maneuverable exhaust device for use with a gas turbine engine including:
   first variable position flap means partially defining an exhaust stream flow path having a throat and an exit, said first flap means being pivotably connected to an upstream fixed duct portion for varying exhaust stream flow path area convergence;
   second variable position flap means further defining the flow path, said second flap means being downsteam of and pivotably connected to the first flap means for providing variable exhaust stream expansion control in a first operating mode and exhaust stream deflection in a second operating mode;
   third variable position flap means pivotably connected to the second flap means proximate their respective downstream extremities, said third flap means partially defining a variable contour flight control surface; and
   an actuation system operatively connected to at least one of said flap means for synchronously moving said first, second and third flap means to control, in a predetermined relationship the exhaust stream flow path throat area and the exhaust stream flow path exit area, and
   wherein said actuation system comprises first actuation means operatively connected to said first flap means for controlling, through the pivotable connections between the first and second flap means and the second and third flap means, the throat area and the exit area of said first operating mode; and second actuation means carried by and capable of overriding the first actuation means in said second operating mode by positioning said second flap means for deflecting the exhaust stream and, by positioning said third flap means, for changing the camber of the flight control surface.

3. The flight maneuverable exhaust device of claim 2 wherein said actuation system further comprises first actuation means including:

a main actuator;

carriage means operatively connected to said main actuator;

track means mounted upon said first duct portion and receiving said carriage means in sliding relationship; and linkage means operatively connecting said carriage means and said first flap means, the dimensions of said linkage means being such that translation of said carriage means along said track under the influence of said main actuator controls the exhaust stream throat area and exit area defined, at least partially, by the first and second flaps, in a predetermined relationship.

4. The flight maneuverable exhaust device of claim 3 wherein said linkage means comprises:

a bellcrank affixed to the fixed duct portion;

a first link operatively connecting the carriage means and the bellcrank; and a second link operatively connecting the bellcrank and the first flap means.

5. The flight maneuverable exhaust device of claim 3 wherein said actuation system further comprises second actuation means including a vectoring actuator connected to and carried by said carriage means, said vectoring actuator being operatively connected to the upstream extremity of the third flap means such that during said first operating mode the vectoring actuator holds the third flap means in a substantially constant axial special relationship with the carriage means, and during said second operating mode the vectoring actuator translates said third flap means with respect to the carriage means, thereby changing camber of the flight control surface and simultaneously deflecting the exhaust gas stream with the second flap means.

6. The flight maneuverable exhaust device of claim 5 wherein the upstream extremity of the third flap means is provided with a trunnion which is received by an elongated slot within said carriage, said vectoring actuator being operatively connected to said trunnion to translate said trunnion along said slot.

7. The flight maneuverable exhaust device of claim 5 wherein the main actuator and the vectoring actuator are of the hydraulic variety.

8. The flight maneuverable exhaust device of claim 2 wherein said first flap means is connected to a piston face in fluid communication with a source of pressurized fluid to produce a moment about said pivot connection at least partially counterbalancing any moment created by the exhaust gas acting upon said first flap means.

9. The flight maneuverable exhaust device of claim 8 wherein said piston face is generally planar.

10. The flight maneuverable exhaust device of claim 8 wherein said piston face includes a seal extension adapted to move along an arcuate sealing surface to reduce the flow of pressurized fluid therebetween.

11. The flight maneuverable exhaust device of claim 8 further including means to transfer at least a portion of said pressurized fluid acting upon said piston face to the upstream extremity of said second flap means and to eject said fluid over said second flap means in a cooling film.

12. The flight maneuverable exhaust device of claim 11 wherein said means to transfer includes a conduit within said first flap means a first end of which communicates with said piston face and a second end of which terminates in an opening proximate the pivot connection between the first and second flap means.

13. An actuation system for use in a gas turbine engine flight maneuverable exhaust device, said actuation means comprising:

first actuation means to position a variable exhaust stream flow path defining wall and to thereby simultaneously control, in predetermined relationship, the ratio of exhaust stream flow path throat area and exhaust stream flow path exit area in a first operating mode; and second actuation means carried by the first actuation means and adapted to override the first actuation means in a second operating mode by positioning a portion of the wall to both deflect the exhaust stream and change the exhaust stream flow path exit area.

14. The actuation system of claim 13 wherein said first actuation means is operatively connected to a variable position flap comprising a portion of said wall partially defining the exhaust stream flow path.

15. The actuation system of claim 14 wherein said first actuation means comprises:

a main actuator;

carriage means operatively connected to said main actuator;

track means mounted upon a fixed duct portion of said flight maneuverable exhaust device and receiving said carriage means in sliding relationship; and linkage means operatively connecting said carriage means and said flap, the dimensions of said linkage means being such that translation of said carriage means along said track under the influence of said main actuator positions the flap to control the exhaust stream throat area.

16. The actuation system of claim 15 wherein the main actuator is operatively connected to a variable position convergent flap.

17. The actuation system of claim 16 wherein a variable position divergent flap comprising a further portion of said wall is pivotably connected to the downstream extremity of the convergent flap.

18. The actuation system of claim 17 wherein said second actuation means includes a vectoring actuator connected to and carried by said carriage means, said vectoring actuator being operatively connected to an upstream extremity of a variable position flight control surface defining flap, the downstream extremity of which is pivotably connected to a downstream extremity of said divergent flap, such that during said first operating mode the vectoring actuator holds the flight control surface defining flap in a substantially constant axial spacial relationship with the carriage means; and during said second operating mode the vectoring actuator translates the flight control surface defining flap with respect to the carriage means.

19. The actuation system of claim 17 wherein said linkage means comprises:
    a bellcrank connected to the fixed duct portion,
    a first link operatively connecting the carriage means and the bellcrank; and
    a second link operatively connecting the bellcrank and convergent flap.

20. The actuation system of claim 17 wherein said main actuator and said vectoring actuator are of the hydraulic variety.

21. A pressure balanced flap pivotable about an axis proximate one end thereof and partially defining a gas turbine engine exhaust stream flow path, said flap including a piston face in fluid communication with a source of pressurized fluid to produce a first moment about said axis, said moment tending to counter a second moment produced by pressure of the exhaust stream against said flap.

22. An aircraft having a gas turbine engine flight maneuverable exhaust device comprising:
    first variable position flap means partially defining an exhaust stream flow path having a throat and an exit, said first flap means being pivotably connected to an upstream fixed duct portion for varying exhaust stream flow path area convergence;
    second variable position flap means further defining the flow path, said second flap means being downstream of and pivotably connected to the first flap means for providing variable exhaust stream expansion control in a first operating mode and exhaust stream deflection in a second operating mode;
    third variable position flap means pivotably connected to the second flap means proximate their respective downstream extremities, said third flap means partially defining a variable contour aircraft flight control surface; and
    an actuation system operatively connected to at least one of said flap means for synchronously moving said first, second and third flap means to control, in a predetermined relationship the exhaust stream flow path throat area and the exhaust stream flow path exit area.

* * * * *

UNITED STATES PATENT OFFICE
CERTIFICATE OF CORRECTION

PATENT NO. : 4,000,854
DATED : January 4, 1977
INVENTOR(S) : Mieczyslaw Konarski and Dudley O. Nash It is certified that error appears in the above-identified patent and that said Letters Patent are hereby corrected as shown below:

Column 9, line 17, "first" should be --fixed--; and line 43, "special" should be --spacial--.

Signed and Sealed this

Twelfth Day of April 1977

[SEAL]

Attest:

RUTH C. MASON
*Attesting Officer*

C. MARSHALL DANN
*Commissioner of Patents and Trademarks*